UNITED STATES PATENT OFFICE.

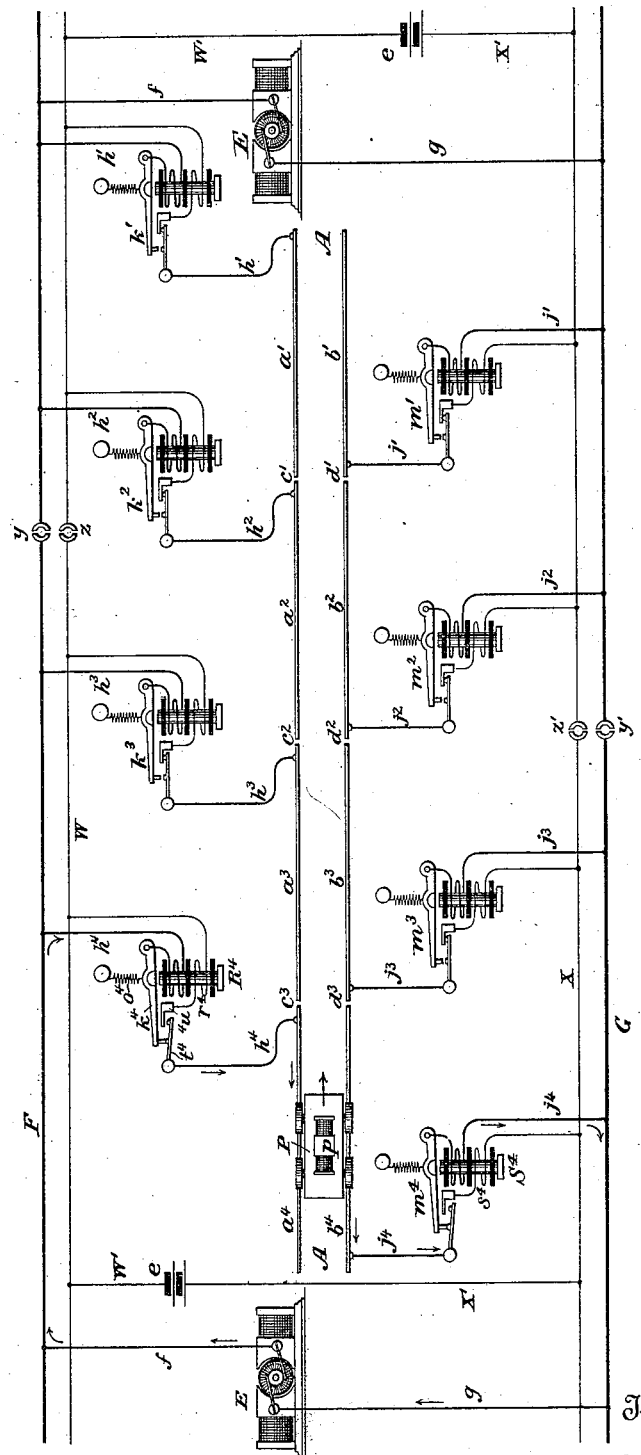

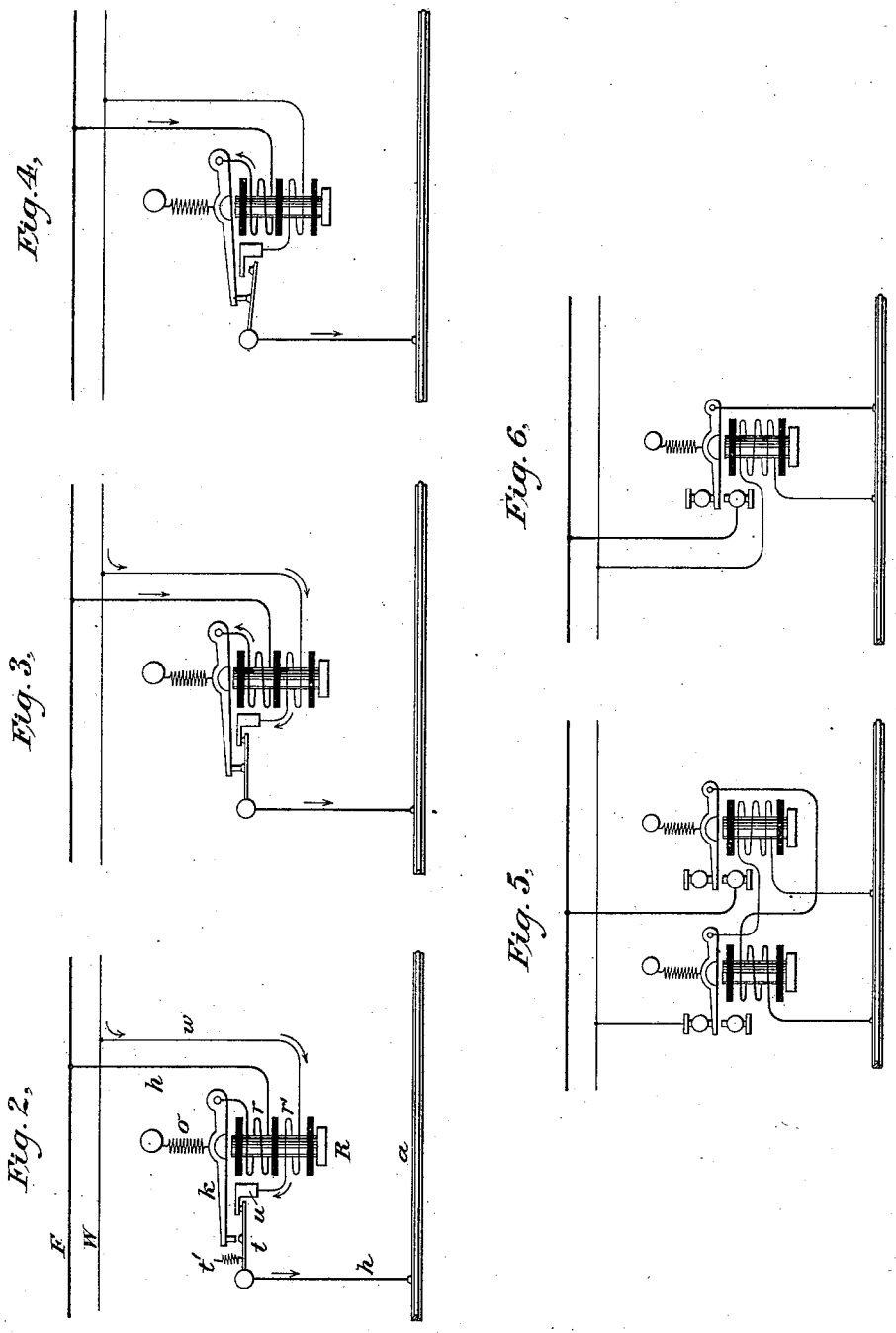

FRANK L. POPE, OF ELIZABETH, NEW JERSEY.

CIRCUIT FOR ELECTRIC RAILWAYS.

SPECIFICATION forming part of Letters Patent No. 333,970, dated January 5, 1886.

Application filed December 29, 1884. Serial No. 151,405. (No model.)

*To all whom it may concern:*

Be it known that I, FRANK L. POPE, a citizen of the United States, residing in Elizabeth, in the county of Union and State of New Jersey, have invented certain new and useful Improvements in Circuits for Electric Railways, of which the following is a specification.

My invention relates to apparatus for propelling vehicles upon railroads by electricity; and it consists in an improved organization of circuits and apparatus for conveying the electric current from stationary sources of electricity situated at convenient points along the line of the railroad to the vehicle or vehicles moving thereupon.

In electric-railroad systems heretofore in use two principal methods have been employed for conveying the electric current to the moving vehicle. In one system the track of the railroad is divided into sections of convenient length, the opposite rails of each section being insulated from each other as completely as possible, and each line of rails of each section being, in like manner, insulated from the abutting rails of the next adjacent section in both directions. Each section thus prepared has its opposite lines of rails permanently connected with the opposite poles of a dynamo-electric generator driven by a steam-engine or other suitable motor. The objections to this system arise mainly from the difficulty which is found in practice in maintaining adequate insulation between the opposite lines of rails. It has been found necessary not only to make use of electric currents of low potential, but also to make the sections as short as possible, so as to reduce the loss of electricity by leakage; but inasmuch as each section must be equipped with a separate generator the cost of the entire equipment for a line of railroad of considerable length becomes very great, while, on the other hand, the percentage of efficiency is comparatively low.

In order to avoid the objections inherent in the hereinbefore-described system, one or more specially-insulated conductors have been extended for a considerable distance, in some cases even several miles, along the line of railroad-track and parallel thereto. It is obvious that such conductors may be more conveniently and efficiently insulated than the rails of the track, and consequently that a much greater length of railroad may be supplied with electricity from a single dynamo or group of dynamos without material loss; but, on the other hand, this system renders necessary the employment of a traveling-contact apparatus to maintain an uninterrupted electrical connection between the conductor and the moving vehicle or vehicles. Devices of this kind have been found inconvenient and unsatisfactory in their operation, and especially liable to derangement when the speed of the vehicle is very great.

In my present invention I have sought to combine the advantages and avoid the disadvantages of the two systems hereinbefore described. The railroad-track is divided into insulated sections, as in the first-described system, which sections may be of any convenient or desirable length. Instead of attaching a special dynamo to each insulated section of track, I make use of two or more generators or groups of generators for supplying the electric current to the whole system. I extend two especially insulated conductors along the entire length of the railroad and parallel thereto, one of which may be designated as the "positive" and the other as the "negative" conductor. The positive pole of each generator, wherever situated, is united with the positive conductor, and the negative pole of each generator in like manner with the negative conductor. Branch conductors are provided, by means of which the opposite insulated lines of rails of each section are, when required, connected, respectively, with the positive and negative electric conductors extending from the generators. Circuit-controlling devices are placed in each of these branches, which circuit-closers are automatically actuated to form a connection between the opposite rails of each track-section and the respective positive and negative conductors extending from the generators, during such time only as the moving vehicle is occupying such track-sections or some portion thereof. By this means the escape or leakage of electricity through the necessarily imperfect insulation of the rails of the track is confined to the particular section which is being traversed by the vehicle, all the other sections being disconnected and absolutely insulated from the main conductors. The sections may consequently with advantage be made very short in places where the insulation of the rails is maintained with difficulty—as, for example, in wet tunnels and in moist ground—while they may be made of much greater length on dry ground and rock ballast, or upon bridges or trestles. The automatic circuit-controllers are actuated by electro-magnets, and these electro-magnets are included in a controlling-circuit which derives its current from an independent source, which current is brought into action by the completion of said circuit between the opposite insulated rails of any given section by the presence of a vehicle thereupon. By this means special contact devices for making connections between the moving vehicle and the stationary main conductors connected with the generators may be entirely dispensed with, the current being transmitted from the rails to the traveling motor through the wheels of the vehicle or vehicles.

The invention further comprises certain details in the construction and organization of the apparatus for automatically controlling the electric current passing from the main conductors through the branch circuits to the insulated track-sections.

In the accompanying drawings, Figures 1, 2, 3, and 4 are diagrams illustrating my invention, and Figs. 5 and 6 represent certain modifications in the construction of a portion of the apparatus.

In the figures A A represent a railway-track, which is divided into insulated sections of convenient length, as shown at $a'\,b'$, $a^2\,b^2$, $a^3\,b^3$, and $a^4\,b^4$. The abutting ends of the rails which form the terminations of these sections are rendered mechanically continuous, but electrically discontinuous, by the interposition of insulated rail-joints, which may be constructed in any suitable or well-known manner—such, for example, as that described in my former Letters Patent No. 129,425, of July 16, 1872, to which reference is had. These insulating-joints are inserted in the track at proper intervals and separate the adjacent sections from each other, as shown at $c'\,d'$, $c^2\,d^2$, and $c^3\,d^3$. This method of dividing a railroad-track into insulated sections is well known in connection with the art of automatic railway-signaling, and in itself forms no part of the present invention. It may be remarked, however, that it is desirable in practice to apply a special conducting-connection between the abutting ends of the adjacent rails which constitute the insulated section. Such a connection is shown and described, for example, in the patent of Gassett and Fisher, No. 227,102, of May 4, 1880. The length of the insulated sections of track need not be uniform, but may with advantage vary according to circumstances from, say, five hundred to two thousand feet in length. The more perfect the insulation of the track the longer the section may be made. Two insulated electrical conductors, F and G, are extended along the line of the railroad and parallel and in convenient proximity thereto. These conductors are preferably formed of thick copper wires or rods, and may be either suspended in the air and attached to posts by suitable insulators, in the manner of an ordinary telegraph-line, or they may be placed in tubes above or beneath the surface of the ground, or arranged in any other convenient manner. At two or more convenient points, distributed as uniformly as possible along the total length of the main conductors and of the railroad, suitable sources of electricity are established, preferably consisting of dynamo-machines, arranged either singly or in groups and driven by steam-engines or other convenient prime motors. The positive and negative terminals of each generator or group of generators E are respectively united by feeders $f$ and $g$ to the main conductors F and G. The opposite insulated lines of rail of each track-section may be respectively connected with the insulated conductors F and G. For example, the rail-section $a'$ may be connected with the conductor F by the branch conductor $h'$, and the opposite rail-section, $b'$, with the conductor G by the branch $j'$. In like manner the branch $h^2$ connects the rail-section $a^2$ with the conductor F, and the branch $j^2$ the rail-section $b^2$ with the conductor G, and so on. Each of the branches $h'$, $j'$, &c., is normally open, being provided with a key or circuit-controller, as seen at $k'k^2$, $m'm^2$, &c. These, when closed, establish an electric connection between the conductors F and G and the insulated lines of rail. When the opposite insulated lines of rail of any particular section of track are thus placed in electrical connection with the opposite poles of the generator E, and a suitable electric locomotive is placed thereupon, consisting of a car, truck, or other vehicle having metallic wheels running upon said rails and insulated from each other in such a way that an electrical connection may be formed through said wheels and through an electric motor mounted upon said vehicle, it will be understood that said vehicle may be propelled by the action of said motor along the track A A. Such a locomotive is shown at P, having a suitable electric motor, $p$, mounted thereon.

In the drawings the circuit-controllers $k^4$ and $m^4$ are shown as closed, and the electric current accordingly passes, as indicated by the arrows, from the generator E along the conductor F, and through the circuit-controller $k^4$ and branch $h^4$ to the insulated track-rail $a^4$; thence through the wheels of the locomotive P and the motor $p$, passing out again through the opposite rail of the insulated rail-section $b^4$, branch conductor $j^4$, and circuit-controller $m^4$ to the conductor G, and thence through said conductor and the feeder $g$ to the opposite poles of the generator. The locomotive will thus be propelled along the track A A in the direction of the arrow until it reaches the insulated section $a^3\,b^3$, when the circuit-controllers $k^4\,m^4$ are simultaneously thrown open, while those at $k^3$ and $m^3$ are simultaneously closed. The current is now thrown upon the section $a^3 b^3$, and the locomotive is made to traverse that section in the same manner. It is to be understood that the direction in which the vehicle moves upon the railroad is determined by means of appliances placed upon the vehicle itself and under control of its driver, and that it does not depend in any manner upon the direction of the electric current traversing the conductors and insulated track-sections.

The manner in which the circuit-controllers are automatically actuated by electro-magnets, the helices of which are in an independent circuit, will next be explained.

Referring to Fig. 2, R is an electro-magnet provided with two independent helices, $r$ $r'$. The branch conductor $h$ extends from the main conductor F and includes the helix $r$ of the electro-magnet R, and is then connected with the armature-lever, which forms the circuit-controller $k$, and which is normally kept open by the action of the spring $o$. W is an independent main conductor extending to a separate source of electricity, having no electrical connection with the source which supplies the conductor F. A branch, $w$, from this conductor, in which is included the independent helix $r'$ upon the electro-magnet R, extends to the stop $u$, against which the pivoted contact-lever $t$ normally bears, being held in that position by the tension of the spring $t'$. From the contact-lever $t$ a conductor, which is the continuation of the conductor $h$, and is designated by the same reference-letter, extends to the insulated track-rail $a$. Thus it will be understood that the circuit between the conductor F and the track-rail $a$, through the branch conductor $h$, is normally open, while on the other hand the circuit from the conductor W through the branch $w$ and part of the conductor $h$ to the rail-track $a$ is normally closed.

Referring now to Fig. 1, it will be seen that the independent conductors W and X of the controlling-circuit are arranged in substantially the same manner as the main conductors F and G, extending in like manner along the entire line of the railroad and provided at convenient intervals with sources of electricity $e$ $e$, which may be either voltaic batteries or dynamo-electric machines. These are united in parallel series with the conductors W and X by means of feeders W' and X', as shown. The branch of the main circuit leading to each insulated line of rail of each track-section passes through an automatic circuit-controlling device, as shown in Fig. 1—such, for example, as that hereinbefore described in connection with Fig. 2. The connections of the opposite lines of rails are preferably made at opposite ends of the section. For example, in Fig. 1 the positive conductor $h^2$ is connected to the right-hand end of the insulated rail-section $a^2$, while the corresponding negative conductor, $j^2$, is connected to the left-hand end of the insulated rail $b^2$. The object of this arrangement is to secure a more perfect uniformity in the volume of the electric current passing through the motor which actuates a vehicle passing along the rails, inasmuch as the total length and resistance of the insulated rail actually in circuit will, under these conditions, be precisely the same, irrespective of the position of the motor upon the section.

The operation of the apparatus is as follows: When there is no vehicle upon the track, the circuit-controllers are all open, as at $k$ in Fig. 2, and the main conductors F and G, which are common to all the electric generators, are absolutely disconnected from the track at every point. The pair of conductors W and X of the controlling-circuit are, on the other hand, normally in connection with each one of the track-sections, in the manner shown in Fig. 2. Matters being in this condition, if a vehicle enters upon one of the insulated sections, as shown at P in Fig. 1, an electrical connection is completed between the conductors W and X, which traverses the circuit-controlling apparatus as follows, (see Fig. 2:) From the conductor W, through the branch $w$, helix $r'$, contact-stop $u$, contact-lever $t$, and conductor $h$, to the insulated rail-section $a$. The passage of this current through the helix $r'$ causes the electro-magnet R to attract its armature and armature-lever $k$, thus bringing the apparatus into the position shown in Fig. 3, in which an electrical connection is completed between the conductors F and G. A powerful current now passes from the conductor F, through the branch $h$, helix $r$, armature-lever $k$, contact-lever $t$, and conductor $h$, to the insulated rail-section $a$. This position of the apparatus is only maintained for an instant, as the attraction caused by the passage of the current through the helix $r$, in addition to that already due to the attraction of the helix $r'$, causes such an increased attraction upon the armature and armature-lever $k$ as to overcome the tension of the spring $t'$ and depress the contact-lever $t$, as shown in Fig. 4, forcing it away from the stop $u$, and thus breaking the circuit through the wire $w$ and helix $r'$. The armature-lever $k$ and contact-lever $t$ will now be maintained in this position by the attraction due to the helix $r$ alone until the circuit is broken at another point by the passage of the vehicle off from the insulated section of track. It will therefore be understood that whenever the opposite insulated lines of rails of any track-section are electrically connected together by the entrance of a locomotive or vehicle, P, upon the section the circuit is first closed between the conductors W and X, whereby the electro-magnets $R^4$ and $S^4$ are caused to attract their armatures, the effect of which is to interrupt the circuit between the conductors W and X and to simultaneously establish a new circuit between the conductors F and G, thus bringing a powerful current into action for the purpose of impelling the locomotive or vehicle along the line of the railroad. When the vehicle passes off from the section, the first interruption of the circuit takes place at the point of contact between the wheels and the rails, and not at the point of contact of the circuit-controller, and thus the resultant spark is produced at a point where it can do no harm and cannot interfere in the least with the proper working of the apparatus.

I have shown in Fig. 5 a slight modification of the circuit-controlling apparatus, which differs from that shown in Fig. 2 in that I make use of two independent electro-magnets instead of two independent helices upon one electro-magnet, and two independent armature-levers instead of one armature-lever acting upon a separate contact-lever. The mode of operation is, however, precisely the same as in the first instance and will be obvious without detailed explanations.

In Fig. 6 I have shown still another modification of the circuit-controller, in which the circuit between the conductors W and X is not interrupted when the circuit is closed between the conductors F and G. This organization, although somewhat simple in construction, is liable to be interferred with by any accidental failure of insulation, by reason of which a partial connection is formed between the two independent circuits extending along the line of the road, and its use therefor, under ordinary conditions of construction, is not to be recommended.

By means of peg-switches or equivalent connectors of well-known construction, as shown at $y\ y'\ z\ z'$, the conductors F and G, as well as W and X, may be separated into independent sections, leaving one dynamo or group of dynamos or other generators remaining connected with each section. This provision is necessary in a system of this kind, so that in case a permanent electrical connection should be accidentally formed between the positive and negative conductors any particular section of the conductors may be detached from the others, and thus the running of the vehicles on other portions of the track will not in any manner be interfered with.

From the foregoing description, it will further be understood that the electro-magnets $R^4$ and $S^4$ are maintained under the uninterrupted control of the electric locomotive, so long as the latter occupies any portion of the insulated lines of rails which are included with the said electro magnet or magnets in an electric circuit to which said locomotive forms a movable circuit-closer, and that the supply of electricity which actuates said locomotive is determined by a circuit-controller actuated by the armature or armatures of said electro magnet or magnets. This circuit-controlling apparatus is preferably duplicated in this manner in order that the rails of the track may be wholly disconnected from both the positive and negative poles of the generator when not in use by the locomotive, in order to prevent all unnecessary waste of electricity. The amount of leakage which takes place through the high resistance of the helices $r^4$ $s^4$ when the locomotive is on the section is so small as to be practically negligible. In this system it is not necessary to employ any means of insulating the opposite rails from each other or from the earth, except to place them upon the cross-ties of wood, as the loss by leakage is comparatively small unless a considerable length of track is included in the section. The sections may, however, be made quite short where circumstances require it, and the leakage thus reduced to a minimum.

I claim as my invention—

1. The combination, substantially as hereinbefore set forth, of an electrically connected and insulated line of rails in a railroad-track, a conductor for connecting said line of rails with a source of electricity, a normally-open circuit-controller placed in said conductor, an electro-magnet for actuating said circuit-controller, and an independent electric circuit for actuating said electro-magnet, which last-named circuit is completed by the presence of a vehicle on said insulated line of rails.

2. The combination, substantially as hereinbefore set forth, of a railroad-track having its opposite lines of rails electrically insulated from each other, two electric conductors which unite said opposite lines of rails respectively with the opposite poles of a generator of electricity, two circuit-controllers, one in each of said conductors, which are simultaneously actuated to admit an operative electric current to said track or to interrupt the same, and electro-magnets for actuating said circuit-controllers having helices included in another electric circuit distinct from that of the said generator.

3. The combination, substantially as hereinbefore set forth, of an electrically connected and insulated line of rails in a railroad-track, a normally-closed conductor connecting said line of rails with a source of electricity, a normally-open conductor connecting said line of rails with another and independent source of electricity, a device for closing said normally-open circuit, and an electro-magnet for actuating said device, the helices of which are included in said normally-closed circuit.

4. The combination, substantially as hereinbefore set forth, of an electrically connected and insulated line of rails in a railroad-track, a normally-closed conductor connecting said line of rails with a source of electricity, a normally-open conductor connecting said line of rails with another and independent source of electricity, a circuit-changing device which simultaneously opens said normally-closed conductor and closes said normally-open conductor, and one or more electro-magnets for actuating said circuit-changing device, the operative helices of which are included in both said circuits.

5. The combination, substantially as hereinbefore set forth, of a railroad-track having its opposite lines of rails electrically insulated from each other and included with a source of electricity in an electric circuit, an electro-magnet which is actuated upon the formation of a conducting-connection between said opposite insulated lines of rails, a circuit-controller actuated by said electro-magnet, and an independent source of electricity, which is brought into action by said circuit-controller, to increase the strength of the electric current traversing the said insulated lines of rails.

6. The combination, substantially as hereinbefore set forth, of a railroad-track divided into two or more sections insulated from each other and from the earth, a generator of electricity, positive and negative conductors extending from the respective poles of said generator along the line of said railroad, and branch conductors uniting the opposite lines of rails of each insulated section of track with said positive and negative conductors, respectively.

In testimony whereof I have hereunto subscribed my name this 27th day of December, A. D. 1884.

FRANK L. POPE.

Witnesses:
   DANL. W. EDGECOMB,
   CHARLES A. TERRY.